United States Patent [19]

Inashvili

[11] Patent Number: 5,277,043
[45] Date of Patent: Jan. 11, 1994

[54] ANTI-THEFT DEVICE FOR VEHICLES

[76] Inventor: Alexander Inashvili, 199 Bay 32 St., Brooklyn, N.Y. 11214

[21] Appl. No.: 9,132

[22] Filed: Jan. 26, 1993

[51] Int. Cl.⁵ .............................................. B60R 25/02
[52] U.S. Cl. ........................................ 70/238; 70/261; 297/487
[58] Field of Search ................ 70/261, 238, 209, 211, 70/212; 180/287; 297/487, 488; 108/44

[56] References Cited

U.S. PATENT DOCUMENTS

| | | | |
|---|---|---|---|
| 5,024,069 | 6/1991 | Hull, Jr. et al. | 70/209 |
| 5,028,086 | 7/1991 | Smith | 70/261 |

FOREIGN PATENT DOCUMENTS

| | | | |
|---|---|---|---|
| 204817 | 12/1919 | Canada | 70/212 |
| 513332 | 11/1930 | Fed. Rep. of Germany | 70/211 |
| 2735782 | 11/1978 | Fed. Rep. of Germany | 70/238 |
| 143132 | 5/1920 | United Kingdom | 70/212 |
| 148683 | 8/1920 | United Kingdom | 70/212 |
| 9009911 | 9/1990 | World Int. Prop. O. | 70/238 |

OTHER PUBLICATIONS

Motor, vol. #92, Issue #4, p. 188, Oct. 1949.

Primary Examiner—Peter M. Cuomo
Assistant Examiner—Darnell M. Boucher
Attorney, Agent, or Firm—Ilya Zborovsky

[57] ABSTRACT

An anti-theft device for vehicles has a member which is mountable above the upper surface of the seat portion of the driver's seat so that an unauthorized person cannot sit in the driver's seat when the device is mounted in the vehicle.

8 Claims, 2 Drawing Sheets

ANTI-THEFT DEVICE FOR VEHICLES

BACKGROUND OF THE INVENTION

The present invention relates to an anti-theft device for vehicles.

Anti-theft devices for vehicles are known in many modifications. One of the most well-known devices is a device which is mountable on a steering wheel so that a thief cannot turn the steering wheel. Other devices are known as well, which are based on different principles. It is believed that it is advisable to provide a further anti-theft device which efficiently prevents stealing of a vehicle.

SUMMARY OF THE INVENTION

Accordingly, it is an object of the present invention to provide an anti-theft device which reliably prevents stealing of a vehicle.

In keeping with these objects and with others which will become apparent hereinafter, one feature of the present invention resides, briefly stated, in an anti-theft device which has a blocking member mountable above an upper surface of a driver's seat so that an unauthorized person cannot sit on the upper surface of the driver seat when the blocking member is mounted on the seat, and means for mounting said blocking member so that it is mountable above an upper surface of a seat portion of the driver's seat.

When the anti-theft device is designed in accordance with the present invention an unauthorized person cannot sit on the upper surface of the driver's seat. He only sit on the blocking member or in other words high above the upper surface of the driver's seat. As a result, his manipulations for driving a stolen car become very difficult, he almost cannot reach an ignition hole, his legs cannot reach a gas pedal of the vehicle, and it is very difficult for him to remove the mounting elements which mount the blocking member above the upper surface of the seat portion of the driver's seat.

In accordance with another advantageous feature of the present invention, means for mounting the blocking member above the upper surface of the seat portion of the driver's seat includes a mounting member which is connected with the blocking member and at the same time engages the steering wheel so as to prevent its turning. Thus, the mounting member performs simultaneously two functions, namely the function of mounting the blocking member and at the same time, locking the steering wheel.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
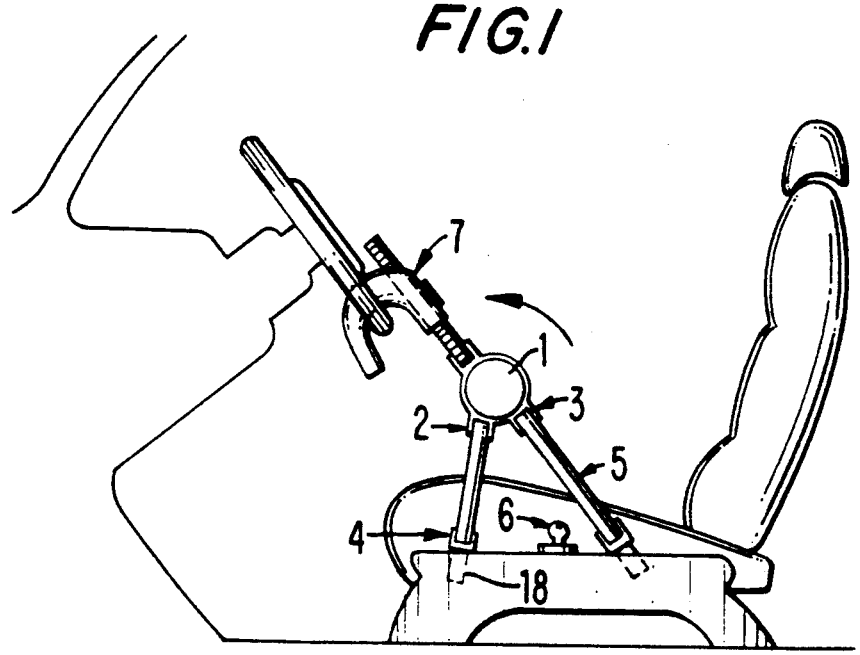
FIG. 1 is a side view of anti-theft device mounted on a driver's seat of a vehicle, in accordance with the present invention.
Figure 2:
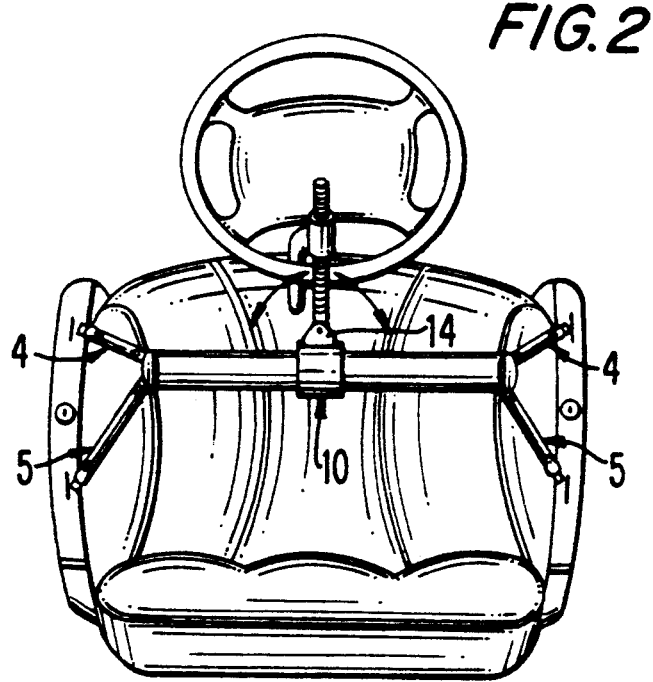
FIG. 2 is a plan view of the anti-theft device of FIG. 1 in accordance with the present invention.
Figure 3:
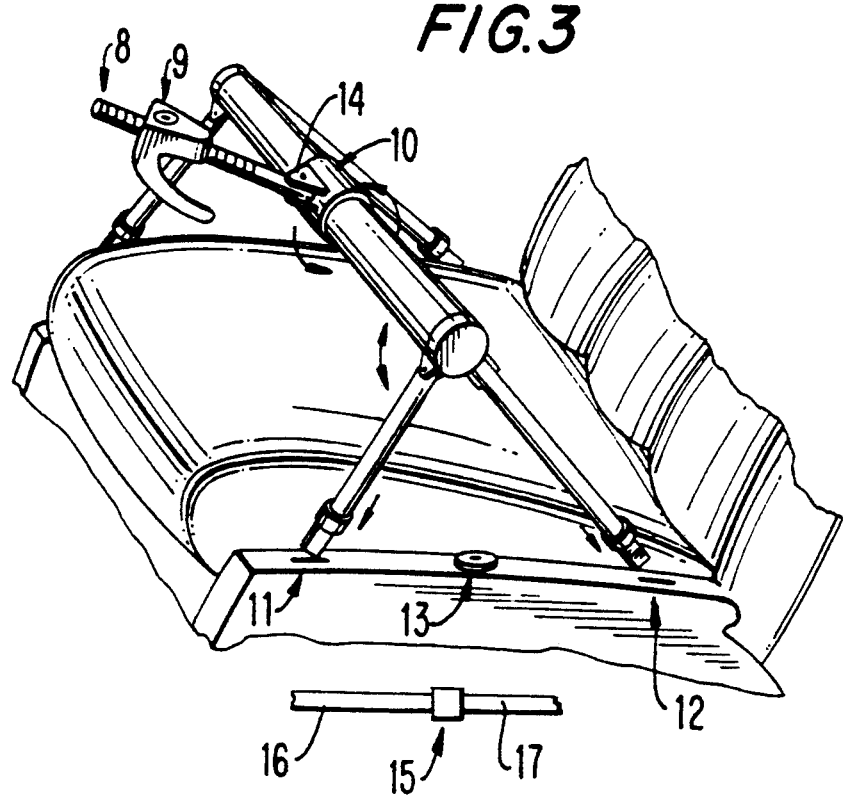
FIG. 3 is a perspective view of the inventive anti-theft device mounted on the driver's seat.

An anti-theft device has a blocking member which is identified with reference numeral 1. The blocking member 1 is formed so that it can be mounted above an upper surface of a seat portion of the driver's seat. The blocking member 1 can be formed for example as a solid or hollow bar, as shown in the drawings. The device further has means for mounting the blocking member 1 above the upper surface of the seat portion of the driver's seat. The mounting means include two pairs of turnable legs 4 and 5 arranged so that each pair is located at one axial end of the blocking member 1. The legs of each pair are pivotally connected by pivots 2 and 3 to the blocking member 1. The pivots 2 and 3 can be formed as simple pins inserted in corresponding holes provided in the upper ends of the legs 4 and 5 and forks extending from the blocking member 1 and surrounding the upper ends of the legs as shown in the drawings. The forks can be welded to the blocking member 1. The lower ends of the legs 4 and 5 are insertable for example into slots 11 and 12 provided in the arm rests of the driver's seat. In order to retain the lower ends of the legs 4 and 5 in the slots 11 and 12 of the arm rests of the driver's seat a lock is provided, which includes a keyhole forming element 13 and a spreading lock 15 with two arms 16 and 17 which are biased in opposite directions, for example spring biased away from the center of the lock 15. When the lower ends of the legs 4 and 5 are inserted in the slots 11 and 12, the arms 16 and 17 automatically snap into small grooves 18 provided on the lower ends of the legs 4 and 5, similarly to seat belts. In order to remove the legs 4 and 5 from the slots 11 and 12, a key 6 is inserted in the keyhole 17 and turned so as to withdraw the arms 16 and 17 toward the center of the lock and to release the lower ends of the legs 4 and 5. Thereupon the legs can be withdrawn from the slots.

Mounting means further include a mounting unit which releasably mounts the blocking element 1 on the steering wheel. The mounting unit includes a rod 8 which is pivotally connected with the blocking element 1. The connection is performed for example by a smooth sleeve 10 which is turnably mounted on the blocking element 1 and provided with a fork which in turn is pivotally connected with the rod 8. Thus, the rod 8 can turn around the axis of the blocking element 1 due to the sleeve 10 and also turn about an axis extending transverse to the axis of the blocking element 1. The rod 8 is provided with a plurality of serrations. The locking element 9 is movable on the rod 8 and has a hook portion shaped to engage around a portion of the steering wheel. When the hook portion engages around the portion of the steering the locking element 9 is moved along the rod 8 toward the blocking element 1 as close as possible, and then locked by a key inserted in a keyhole. The inner mechanism of the locking element 9 is not shown in the drawings, since it is well known. The lock includes a catch which engages in the gap between two neighboring serrations of the rod 8.

The mounting unit 8, 9 simultaneously performs two functions. On the one hand, it additionally mounts the blocking element 1 to the steering wheel, and on the other hand in the mounted condition prevents turning of the steering wheel.

When the device is designed in accordance with the present invention, an unauthorized person cannot sit on the upper surface of the seat portion of the driver's seat, but instead he has to sit on the blocking element 1 high above the upper surface. In this position it is very difficult for him to manipulate, for example to remove the locking unit 8, 9. Even if the unit 8, 9 can be removed, the legs of such a person would not reach the gas pedal since he sits high above the upper surface of the seat portion of the driver's seat. Also, to remove the whole device including the blocking element 1, the legs 4, 5 and the locking unit 8, 9 requires considerable efforts and time, much more time than the removal of a steering wheel anti-theft bar. Also, when a potential thief sees the device installed on the driver's seat, he is discouraged from steeling the car since he knows in advance that the removal of such a device would require tremendous efforts.

Figure 4:
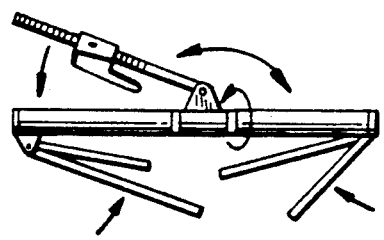
FIG. 4 is a view illustrating the process of folding of the device of the invention.
Figure 5:
FIG. 5 is a view showing the inventive anti-theft device in a folded condition.

As can be seen from FIGS. 4 and 5, the device is very portable and can be easily folded so as to occupy a very little space. The device in the folded condition can be stored for example under the seat portion of the driver's seat.

With very little efforts, the device can be installed on the existing cars. It is to be understood, that it can be provided as an attachment to new cars, similarly to seat belts, air bags, etc. Also, other means for mounting the blocking element 1 to the driver's seat are possible as well.

Thus, broadly speaking, when the inventive anti-theft device is installed in the car, not only the steering wheel is reliably locked but also the seat is blocked as well so that a thief cannot even sit down in the driver's seat in order to drive.

It will be understood that each of the elements described above, or two or more together, may also find a useful application in other types of constructions differing from the types described above.

While the invention has been illustrated and described as embodied in an anti-theft device for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An anti-theft device for vehicles, comprising a blocking element mountable about an upper surface of a seat portion of a driver's seat of the vehicle, so that an unauthorized person cannot sit down in the driver's seat; means for mounting said blocking element in the vehicle, said blocking element being mountable so that it extends substantially transverse to a central longitudinal axis of the seat portion of the driver's seat and has two opposite ends, said mounting means including a mounting member arranged at each of said ends of said blocking element; and locking means including arm rests of the driver's seat and elements for locking each of said mounting members in a respective one of said arm rests, so that when said blocking element is mounted above the upper surface of the seat portion of the driver's seat exclusively by said mounting means and said locking means said blocking element prevents sitting down of the unauthorized person in the driver's seat.

2. An anti-theft device as defined in claim 1, wherein said mounting members are formed by two pairs of turnable legs arranged so that each of said pairs of said turnable legs mounts a respective one of said ends of said blocking element to a respective one of said arm rests of the driver's seat.

3. An anti-theft device for vehicles, comprising a blocking element mountable above an upper surface of a seat portion of a driver's seat of the vehicle, so that an unauthorized person cannot sit down in the driver's seat; and means for mounting said blocking element in the vehicle, said blocking element being mountable so that it extends substantially transverse to a central longitudinal axis of the seat portion of the driver's seat and has two opposite ends, said mounting means including two pairs of turnable legs arranged so that each of said pairs of turnable legs mounts a respective one of said ends of said blocking element to the driver's seat, said legs being connected with said blocking element turnably about an axis extending transverse to an axis of said blocking element so that said legs can be folded along said blocking element.

4. An anti-theft device for vehicles, comprising a blocking element mountable above an upper surface of a seat portion of a driver's seat of the vehicle, so that an unauthorized person cannot sit down in the driver's seat; means for mounting said blocking element in the vehicle, said blocking element being mountable so that it extends substantially transverse to a central longitudinal axis of the seat portion of the driver's seat and has two opposite ends, said mounting means including two pairs of turnable legs arranged so that each of said pairs of said turnable legs mounts a respective one of said ends of said blocking element to the driver's seat; and locking means including arm rests of the driver's seat and means for locking said legs in said arm rests of said driver's seat.

5. An anti-theft device as defined in claim 4, wherein said locking means includes spreadable arms each engaging with and locking an end of a respective one of said legs in the respective arm rest.

6. An anti-theft device as defined in claim 1, wherein said mounting means also includes a mounting unit which is formed to mount said blocking element to a steering wheel of the vehicle and to simultaneously prevent unauthorized turning of the steering wheel.

7. An anti-theft device as defined in claim 6, wherein said mounting unit includes a bar which is turnably connected with said blocking element, and a slideable lock having a curved portion shaped to engage a round portion of the steering wheel and a locking portion moveable on said bar and lockable in any location of said bar so as to firmly lock the mounting unit on the steering wheel.

8. An anti-theft device as defined in claim 71 wherein said bar is turnable relative to said blocking element about an axis which extends transverse to an axis of said blocking element, so that said bar is foldable along said blocking element.

* * * * *